June 28, 1932.  R. E. WELLS  1,864,625
VEHICLE CONSTRUCTION
Filed Jan. 25, 1930   2 Sheets-Sheet 1
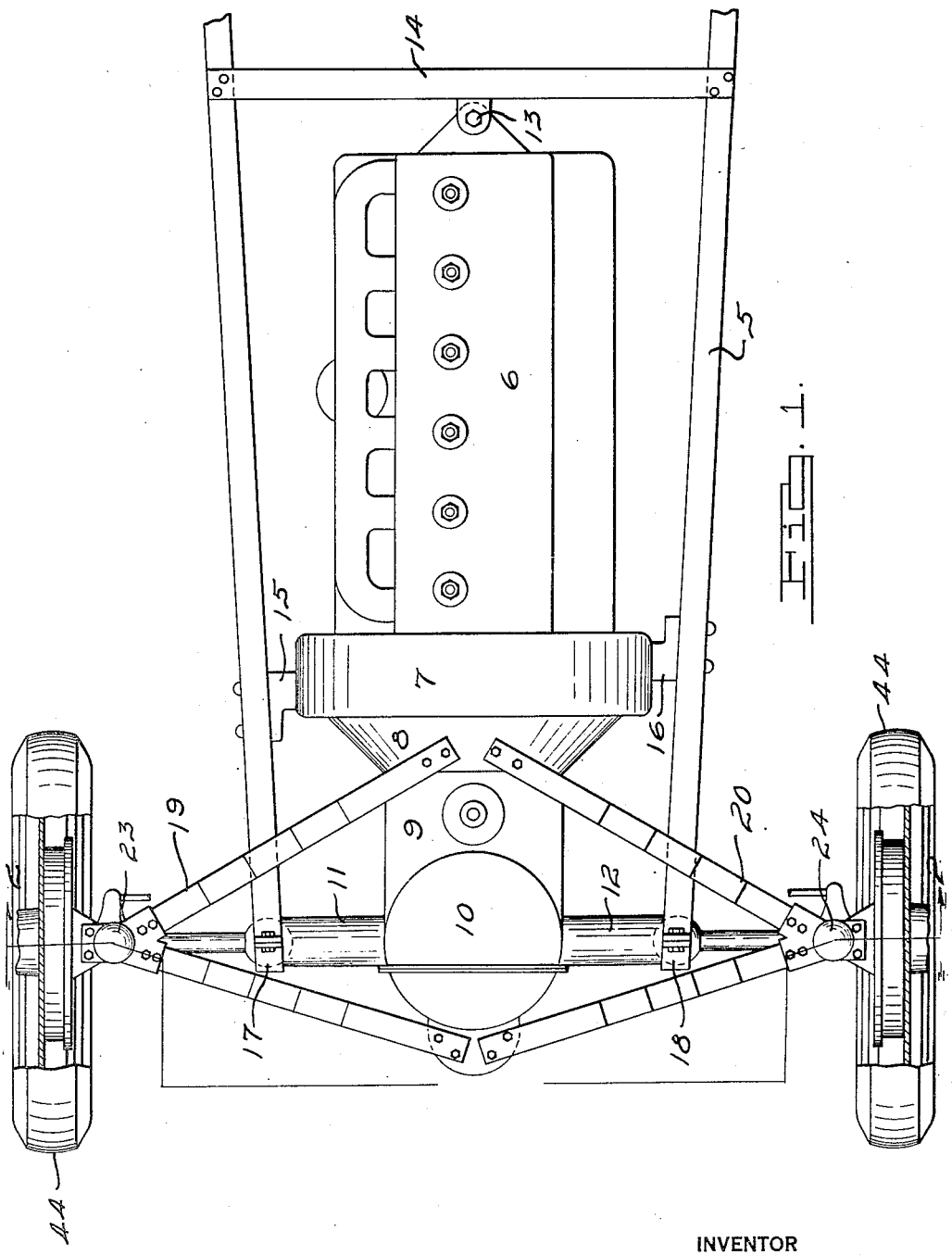
INVENTOR
Rex E. Wells.
BY
ATTORNEYS June 28, 1932.  R. E. WELLS  1,864,625
VEHICLE CONSTRUCTION
Filed Jan. 25, 1930   2 Sheets-Sheet 2
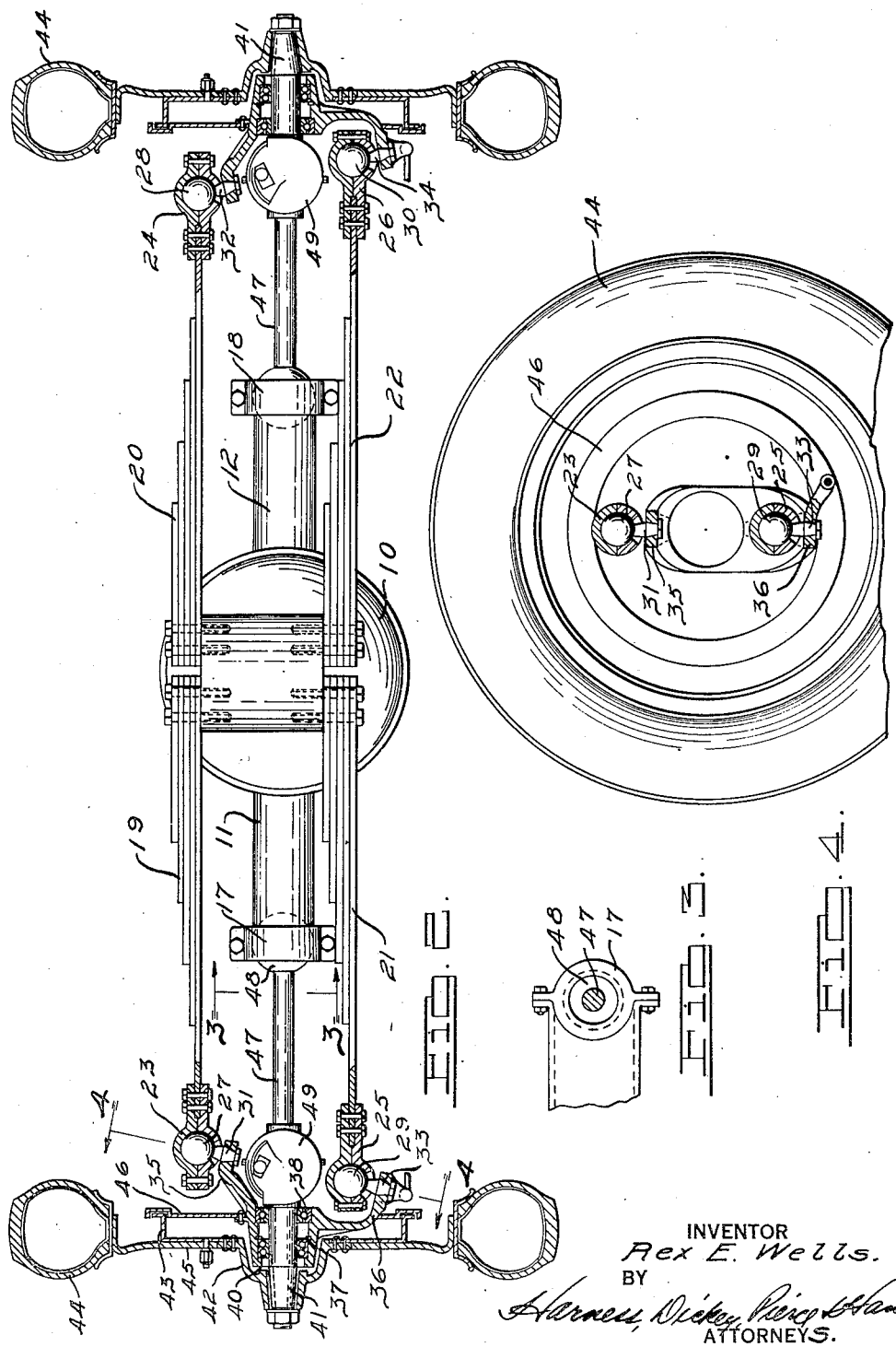
INVENTOR
Rex E. Wells.
BY
ATTORNEYS.

Patented June 28, 1932

1,864,625

UNITED STATES PATENT OFFICE

REX E. WELLS, OF DETROIT, MICHIGAN

VEHICLE CONSTRUCTION

Application filed January 25, 1930. Serial No. 423,516.

This invention relates to the construction of vehicles.

The main objects of this invention are, to provide an improved construction of wheel suspension which will permit pivotal movement for guiding the vehicle and bodily movement in a vertical plane relatively to the vehicle for absorbing road shocks; to provide an improved construction particularly suitable for front wheel drive automobiles; to provide a simple structure in which the spring outer end connections and the king pin pivots are combined into a single joint having only two interfitting cooperating members; to provide a construction in which the driving torque of the wheel is transmitted to the vehicle through the springs which suspend the vehicle; to provide a construction in which the driving or braking torque through the leaf suspension springs will not twist the springs helically about their longitudinal axes, thereby greatly prolonging the life of the springs; to provide a construction of front drive wheel suspension in which ample room is secured for the drive shaft universal, which universal is mounted on the axis of pivotal movement of the wheel; and to provide a generally improved and simplified structure in which ball and socket joints are utilized for the usual king pin and spring eye connections and which will have three degrees of rotational freedom.

An illustrative embodiment of this invention is shown in the accompanying drawings, in which;

Fig. 1 is a top plan view, somewhat diagrammatic, of the front end of a motor vehicle constructed according to my invention.

Fig. 2 is a slightly enlarged view, partly in section and partly in elevation, taken on the line 2—2 of Fig. 1, and looking in the direction indicated by the arrows.

Fig. 3 is a sectional view taken on the line 3—3 of Fig. 2 looking in the direction indicated by the arrows.

Fig. 4 is a sectional view taken on the line 4—4 of Fig. 2, looking in the direction indicated by the arrows.

Heretofore, in the construction of front wheel drive mechanism in which the transversely disposed springs, either two or four in number, are used for the suspension of the vehicle and also for transmitting the driving torque from the wheel to the vehicle, it has been necessary to connect the outer ends of the springs to an intermediate member by means of upper and lower pins whose axes are substantially parallel to the longitudinal axis of the vehicle, and approximately perpendicular to the longitudinal axes of the springs. This intermediate member is in turn pivotally attached to the wheel support by means of upper and lower "king pins", so that the wheels may be turned about a substantially vertical axis to guide the vehicle.

In order to provide room for the drive shaft and drive shaft universal, it has been necessary to separate the king pin connections so as to be spaced above and below the drive shaft and its universal. With all this mechanism, it has been a very difficult and serious problem to incorporate a brake drum and brake shoe mechanism into the structure, particularly on account of the modern trend of design which uses wheels and tires of small diameter.

Furthermore, when the driving torque is transmitted through transverse leaf springs to the vehicle, or when the brakes are applied for stopping the vehicle, there is a tendency to helically twist or flex the leaf springs about their longitudinal axes. Such a twisting strain upon the springs materially shortens their useful life, as it places an unnatural fatiguing strain upon them and progressively decreases their resistance.

In the present construction, the spring eye pivots and the king pin pivots have been combined into two ball and socket joints which have limited universal movement. By reason of this universal joint connection, the springs when in normal position, are relieved from any tendency to be helically twisted as the strain or torque is exerted edgewise against the spring leaves. These vertically spaced ball and socket joints permit bodily movement of the wheel in a vertical plane to absorb road shocks.

In the construction shown in the drawings, a motor vehicle chassis frame 5 is shown with a power unit mounted therein which comprises an internal combustion motor 6, fly wheel and clutch mechanism 7 and 8, transmission 9, differential 10, and axle shaft housings 11 and 12. The rear end of the power unit is secured at 13 to a chassis frame cross member 14, and the front end of the unit is mounted in the chassis side frame by motor legs 15 and 16. The outer end of the axle shaft housings 11 and 12 are secured to the front ends of the chassis side frames by clips 17 and 18.

It is to be understood, however, that this invention is not in any way to be limited to the power unit construction shown herein, and which is merely diagrammatic for the purposes of illustrating one adaptation of my invention.

Suspension and road shock absorbing means are provided for the vehicle and comprise four pairs of members in the form of laterally extending leaf springs 19, 20, 21 and 22. The inner or base ends of each pair are secured to the power unit in longitudinally spaced relation, and converge outwardly with the outer tip ends secured to socket members 23, 24, 25 and 26 respectively of the ball and socket universal joints, which provide for three degrees of rotational freedom.

The pairs of springs 19 and 20 are mounted on the top side of the power unit and extend substantially laterally therefrom, and the pairs of springs 21 and 22 are secured to the lower side of the power unit and extend laterally in the same manner in vertically spaced relation below the upper pairs of springs. The socket members have spherical recesses therein, the centers of which are preferably in prolongation of the longitudinal axis of the main spring leaf to which they are secured, so that end thrust thereagainst will not tend to buckle the spring.

The sockets 23 to 26 inclusive embrace cooperating balls 27, 28, 29 and 30 respectively, which are integrally formed on the upper ends of mounting shanks 31, 32, 33 and 34 respectively. The shanks 31 and 33 are mounted on inwardly extending vertically spaced continuations or arms 35 and 36 which are integrally formed on a wheel support 37.

The wheel support 37 is tubular and has mounted therein suitable anti-friction bearings 38 and 39 which journal a drive shaft 40. The outer tapered end 41 of the shaft 40 is keyed and secured to a hub 42 which supports a wheel 43 and pneumatic tire 44. The arrangement of the wheel support arms 35 and 36 is such that the center line through the balls 27 and 29 is inclined with respect to the plane of rotation of the wheel 43, and the ball mounting shanks 31 and 33 are in axial alignment with the axis of pivotal rotation of the wheel. The said pivotal axis intersects the plane of rotation of the wheel at substantially the point of ground contact, as is customary and usual in modern automobile construction.

A brake drum 45 is secured to the hub 42, and an inner shield or brake shoe mounting plate 46 is secured to the wheel support 37, so as to provide for suitable braking of the wheel in any desired manner, either hydraulic or mechanical.

Means are provided for transmitting power from the power unit to the shaft 40, and comprise a drive shaft 47, the inner end of which terminates in a universal 48 mounted in the outer end of the axle housing 11, and the outer end of which terminates in a universal joint 49 which in turn is connected to the drive shaft 40. The universal 49 is preferably of the self-supporting constant velocity type, and its center of movement is on the line of pivotal movement of the wheel support, i. e. the centers of the balls 27 and 29 and the universal joint 49 are all in alignment. A steering arm 50 is provided to which a suitable drag link or tie bar (not shown) may be secured.

The opposite side of the front end construction is identical with the construction just described, so that one description will suffice for both.

In the operation of this invention, rotative power is transmitted to the driving wheels through the universals 48, shafts 47, and universals 49 to journaled shafts 40, to which the wheels are keyed. When torque is applied to the drive wheels it is transmitted through the pairs of springs to the vehicle, but due to the ball and socket universal connections between the springs and the wheel support, there will be no tendency of a helical twisting of the springs, but merely an edgewise thrust on them, when the springs are in their normal position.

By reason of the mounting shanks for the balls being arranged with their axes in alignment with the axis of pivotal movement of the wheel, the wheel may be freely pivoted through the desired angle for guiding the vehicle. Suitable ball shank clearance is provided in the opening of the socket members which embrace the balls for permitting limited movement of the wheel in a vertical plane, to take up the usual road shocks.

In the arrangement shown, of having outwardly converging springs for the top and bottom supporting units at each side of the vehicle, when power is applied to the wheels for movement in a forward direction the rearwardly inclined springs would be placed under compression and the forwardly inclined springs placed under tension. When the brakes are applied, or when power is applied in a reverse direction these stresses would be reversed on the springs. However, it is to be understood that these ball and socket combined king pin and spring eye joints are equally applicable to constructions in which only two transversely disposed vertically spaced springs or equivalent supporting members are used.

Although but one specific embodiment of this invention has been herein shown and described, it will be understood that numerous details of the construction shown may be altered or omitted without departing from the spirit of this invention, as defined by the following claims.

I claim:

1. In a vehicle construction, the combination of a pair of laterally extending springs having their base ends attached to said vehicle in longitudinally spaced relation, the outer ends of said springs converging and attached to one member of a ball and socket joint, a wheel support, a wheel journaled on said support, said support having the other member of said ball and socket joint secured thereto, a second vertically spaced ball and socket joint having one of its members secured to said wheel support, a laterally extending member having the other member of said last mentioned ball and socket joint secured to the outer end thereof, the inner end of said laterally projecting member being secured to the vehicle.

2. In a vehicle construction, the combination of a chassis frame, a power unit mounted in said frame, said power unit including a motor, clutch, transmission, differential and wheel driving mechanism, a wheel support, a wheel journaled on said support and driven by said mechanism, two pairs of vertically spaced members having their base ends secured to said power unit in longitudinally spaced relation, the outer ends of said member converging, and ball and socket joints providing a universal connection between the outer ends of said vertically spaced members and said wheel support.

3. In a vehicle construction, the combination of a chassis frame, a power unit mounted in said frame, said power unit including a motor, clutch, transmission, differential, and wheel driving mechanism, a wheel support, a wheel journaled on said support and driven by said mechanism, a pair of laterally extending yielding members having their inner base ends secured to said power unit in longitudinally spaced relation, the outer ends of said members converging with respect to each other, a ball and socket joint connecting the outer converging ends of said members to said wheel support for securing universal movement therebetween, and a second pair of laterally extending outwardly converging yielding members similarly connected to said wheel support in vertically spaced relation to said first mentioned ball and socket connection, the drive shaft for said wheel extending between said two pairs of yielding members.

4. In a vehicle construction, the combination of a pair of transversely disposed vertically spaced vehicle supporting members, a wheel support, a wheel journaled on said support, means for driving said wheel, joints for pivoting the outer ends of said vehicle supporting members to said wheel support, said joints comprising spherical socket members and cooperating balls, and mounting shanks on said balls, said shanks being in axial alignment with the axis of pivotal movement of said wheel support, said axis of pivotal movement being inclined with respect to the plane of rotation of said wheel and intersecting therewith substantially at the point of ground contact of said wheel.

5. A vehicle construction, the combination of a wheel support, two pairs of vertically spaced members having their inner base ends secured to the power unit in longitudinally spaced relation, the outer ends of each pair of said members converging with respect to each other, and cooperating ball and socket joint members connecting the outer ends of said springs to said wheel support, the center of said ball and socket joints being in alignment with the center of said springs.

6. A vehicle construction, the combination of a wheel support, having a wheel mounted thereon, two pairs of vertically spaced spring members having their inner base ends secured to the power unit in longitudinally spaced relation, the outer ends of each pair of said members converging with respect to each other, a drive shaft extending through said member for rotating said wheel, and cooperating ball and socket joint members connecting the outer ends of said springs to said wheel support so as to provide horizontal pivotal movement of said wheel support and limited vertical movement relatively to the wheel, the center of said ball and socket joints being in alignment with both the axis of the pistol movement of said wheel and the center of said springs.

REX E. WELLS.